(12) United States Patent
Kim et al.

(10) Patent No.: US 12,494,692 B2
(45) Date of Patent: Dec. 9, 2025

(54) HOLLOW SHAFT MOTOR

(71) Applicants: BMC CO., LTD., Anseong-si (KR); HL Mando Corporation, Pyeongtaek-si (KR)

(72) Inventors: Ok Yun Kim, Seoul (KR); Gwan Seon Jeong, Gwangju (KR)

(73) Assignees: BMC CO., LTD., Anseong-si (KR); HL Mando Corporation, Pyeongtaek-si (KR)

( * ) Notice: Subject to any disclaimer, the term of this patent is extended or adjusted under 35 U.S.C. 154(b) by 211 days.

(21) Appl. No.: 18/426,401

(22) Filed: Jan. 30, 2024

(65) Prior Publication Data

US 2024/0171035 A1    May 23, 2024

Related U.S. Application Data

(63) Continuation of application No. PCT/KR2022/007259, filed on May 20, 2022.

(30) Foreign Application Priority Data

Aug. 13, 2021    (KR) .................. 10-2021-0107050

(51) Int. Cl.
   *H02K 7/06* (2006.01)
   *H02K 5/15* (2006.01)
   *H02K 5/22* (2006.01)

(52) U.S. Cl.
   CPC ............... *H02K 5/225* (2013.01); *H02K 5/15* (2013.01); *H02K 2203/09* (2013.01)

(58) Field of Classification Search
   CPC .......... H02K 7/06; H02K 7/003; H02K 7/083; H02K 7/088; F16H 25/20
   See application file for complete search history.

(56) References Cited

U.S. PATENT DOCUMENTS

| | | |
|---|---|---|
| 8,878,407 B2 | 11/2014 | Ikura |
| 2012/0160043 A1 | 6/2012 | Drumm |

(Continued)

FOREIGN PATENT DOCUMENTS

| | | |
|---|---|---|
| JP | 2000-065179 A | 3/2000 |
| KR | 10-0491695 B1 | 5/2005 |

(Continued)

OTHER PUBLICATIONS

WO-2020251146-A1 Machine Translation (Year: 2020).*
International Search Report of PCT/KR2022/007259 mailed Aug. 26, 2022.

*Primary Examiner* — Oluseye Iwarere
*Assistant Examiner* — Masoud Vaziri
(74) *Attorney, Agent, or Firm* — Revolution IP, PLLC (57) ABSTRACT

The hollow shaft motor according to the present invention comprises a motor housing 11 having a cylindrical shape; a housing cover assembly 12 coupled to an upper portion of the motor housing 11; a stator assembly 20 located in the motor housing 11 and in a lower portion of the housing cover assembly 12; a rotor assembly 30 located in the stator assembly 20 to rotate; a screw shaft 10 coupled to the rotor assembly 30 to rotate together; and a ball nut 17 coupled to the screw shaft 10 to move vertically, wherein the housing cover assembly 12 comprises a housing cover 121 having a sleeve 124 extended downwardly so as for the screw shaft 10 to be located inside, and an inner upward bending part 124B bent inwardly and heading upwardly is formed at the bottom end of the sleeve 124.

5 Claims, 8 Drawing Sheets

(56) References Cited

U.S. PATENT DOCUMENTS

| | | | |
|---|---|---|---|
| 2015/0137641 A1* | 5/2015 | Park | H02K 5/163 |
| | | | 310/90 |
| 2015/0375727 A1* | 12/2015 | Weh | F16H 57/00 |
| | | | 29/428 |
| 2019/0100188 A1 | 4/2019 | Lee | |
| 2020/0208698 A1* | 7/2020 | Kim | F16D 65/18 |
| 2020/0240495 A1* | 7/2020 | Layne | H02K 7/06 |
| 2021/0194311 A1* | 6/2021 | Kim | H02K 7/003 |

FOREIGN PATENT DOCUMENTS

| | | | | |
|---|---|---|---|---|
| KR | 10-2012-0064094 A | 6/2012 | | |
| KR | 10-2016-0001681 A | 1/2016 | | |
| KR | 10-2017-0006535 A | 1/2017 | | |
| KR | 10-2002727 B1 | 7/2019 | | |
| KR | 10-2020-0042813 A | 4/2020 | | |
| KR | 10-2020-0126804 A | 11/2020 | | |
| KR | 10-2190270 B1 | 12/2020 | | |
| WO | WO-2020251146 A1 * | 12/2020 | | H02K 7/088 |

* cited by examiner

HOLLOW SHAFT MOTOR

BACKGROUND OF THE INVENTION

The present invention relates to a motor. More specifically, the present invention relates to a motor adopting a structure capable of performing damping action between a sleeve and a nut to a hollow shaft motor used in an integrated brake system, thereby improving operational reliability of the motor.

In general, a brake system generates pressure in a master cylinder to amplify the force applied to a brake and provides the pressure to a module requiring braking. A hollow shaft motor is used as an apparatus for generating pressure in a master cylinder. Such hollow shaft motor rotates a hollow shaft by the principle of a motor, and applies a screw inside the hollow shaft to use the principle of converting rotary motion into linear motion. The linear motion of the screw actuates a piston to generate or remove the pressure required in the master cylinder.

Recently, an integrated dynamic brake (IDB) system mainly uses a motor with a hollow shaft. Since the hollow shaft of the motor needs to generate high pressure by a screw and a piston operating in the hollow shaft, a considerable axial load is imposed on bearings supporting the hollow shaft. In this regard, four-point contact ball bearings may be used to support the rotation of the hollow shaft.

Korean Patent Laid-open No. 10-2016-0001681 discloses a motor having a structure that can manufacture a hollow shaft and a motor housing by a pressing process. Here, however, since the motor housing has the lower side closed, the assembling operation is difficult, and it is difficult to install a four-point contact ball bearing.

Japanese Patent Laid-open No. 2000-65179 discloses a structure of fastening covers to an upper portion and a lower portion of a motor housing, respectively, by means of bolts. This structure increases manufacturing processes, and makes it difficult to maintain the air tightness between the motor housing and the cover. Korean Patent Laid-open No. 10-2017-0006535 discloses a structure of opening the lower side of a motor housing and assembling a separate cover thereto, and the technique of manufacturing a motor housing by a pressing process such as deep drawing. According to the structure, a separate cover is assembled to the lower side of the motor housing to support bearings supporting a hollow shaft, thereby supporting the load imposed on the hollow shaft. Thus, the assemblability and productivity decrease.

Korean Patent Laid-open No. 10-2020-0126804 discloses a structure of allowing a piston to vertically operate when a motor shaft rotates, and the piston to be guided in a frame inner wall by a guide member and vertically operate. According to the structure, the guide member at the distal end of the piston may give an impact on a frame or a rotor inner wall, or pinch phenomenon may occur, and also grease may leak from the open frame.

Korean Patent No. 10-0491695 discloses a structure of coupling a connecting terminal for connecting an external power source to a bus bar for winding a coil of a motor for each phase by welding. When coupling the connecting terminal to the bus bar by the welding, the reliability of electrical connection is reduced because of contact failure by the welding, and manufacturing costs increases due to the welding. Additionally, even if the bus bar is plated after the welding, plating costs increase because a post-plating process should be performed.

U.S. Pat. No. 8,878,407 discloses the feature of integrally forming an electric power terminal to project towards an upper portion of a bus bar, and bending the projected electric power terminal to be connected to an external electric power source. However, since the electric power terminal projects towards the upper portion of the bus bar, when the bus bar is punched from a base material by a pressing process, it has the L-shape, and thus a lot of scraps may be thrown out from the base material.

SUMMARY OF THE INVENTION

The present invention is invented in order to solve the above-mentioned problems. It is an object of the present invention to provide a hollow shaft motor with a novel structure preventing a nut, coupled to a ball screw shaft for the vertical movement of a piston to move vertically, from giving an impact on a sleeve or being pinched, and preventing the grease from leaking.

It is another object of the present invention to provide a hollow motor with a novel structure manufacturing a bus bar in a straight shape, not in an L shape, and folding the bus bar such that a bus bar terminal protrudes upwardly.

It is yet another object of the present invention to provide a hollow motor with a novel structure allowing a hollow shaft and a motor housing to be produced by a pressing process, thereby reducing manufacturing costs and improving assemblability and productivity.

It is yet another object of the present invention to provide a hollow motor with a novel structure employing a novel structure of a housing cover, and thereby a bearing may be more stably coupled, and a central position may be accurately arranged when coupled to a brake system.

The objects above and other objects inferred therein can be easily achieved by the present invention explained below.

The hollow shaft motor according to the present invention comprises a motor housing 11 having a cylindrical shape; a housing cover assembly 12 coupled to an upper portion of the motor housing 11; a stator assembly 20 located in the motor housing 11 and in a lower portion of the housing cover assembly 12; a rotor assembly 30 located in the stator assembly 20 to rotate, a screw shaft 10 coupled to the rotor assembly 30 to rotate together; and a ball nut 17 coupled to the screw shaft 10 to move vertically, wherein the housing cover assembly 12 comprises a housing cover 121 having a sleeve 124 extended downwardly so as for the screw shaft 10 to be located inside, and an inner upward bending part 124B bent inwardly and heading upwardly is formed at the bottom end of the sleeve 124.

According to the present invention, preferably, at least one protruding part 17A protruding in the outer circumferential direction is formed in an outer circumferential surface of the ball nut 17, and a damper 18 having a slit 18A into which the protruding part 17A is inserted is coupled to the ball nut 17.

According to the present invention, a free mold 125 in which a plurality of bus bars 123 is integrally formed in an insert injection mold may be coupled to the housing cover 121, and a plurality of coupling protruding parts 125A may be formed in an upper portion of the free mold 125, wherein the coupling protruding parts 125A are respectively coupled to a plurality of coupling holes 1211 formed in the housing cover 121.

According to the present invention, the housing cover 121 may include a plurality of bus bars 123, wherein the bus bar 123 may comprise a bus bar main body 123-1 circularly bent; a plurality of coil coupling parts 123A formed in the bus bar main body 123-1 and bent to be electrically connected to a coil; a bus bar terminal 123B formed at one end of the bus bar main body 123-1 to be electrically connected to an external power source; and a first bending part 123C bent in order for the bus bar terminal 123B to protrude upwardly from the bus bar 123.

According to the present invention, preferably, a second bending part 123D bent to locate the bus bar terminal 123B in a circular outer portion of the bus bar main body 123-a is formed in the bus bar main body 123-1.

The present invention prevents a nut, which is coupled to a ball screw shaft for the vertical movement of a piston to move vertically, from giving an impact on a sleeve or being pinched, and preventing the grease from leaking. Additionally, the present invention manufactures a bus bar in a straight shape, not in an L-shape, and folds a bus bar terminal to protrude upwardly, thereby reducing manufacturing costs.

Also, the present invention allows a hollow shaft of a motor and a motor housing to be produced by a pressing process, thereby having the effects of providing a hollow shaft motor with a novel structure capable of reducing manufacturing costs, improving assemblability and productivity, and arranging a central position more accurately when coupled to a brake system.

DETAILED DESCRIPTION OF THE INVENTION

Hereinafter, the present invention will be explained in detail with reference to the accompanying drawings.

Figure 1:
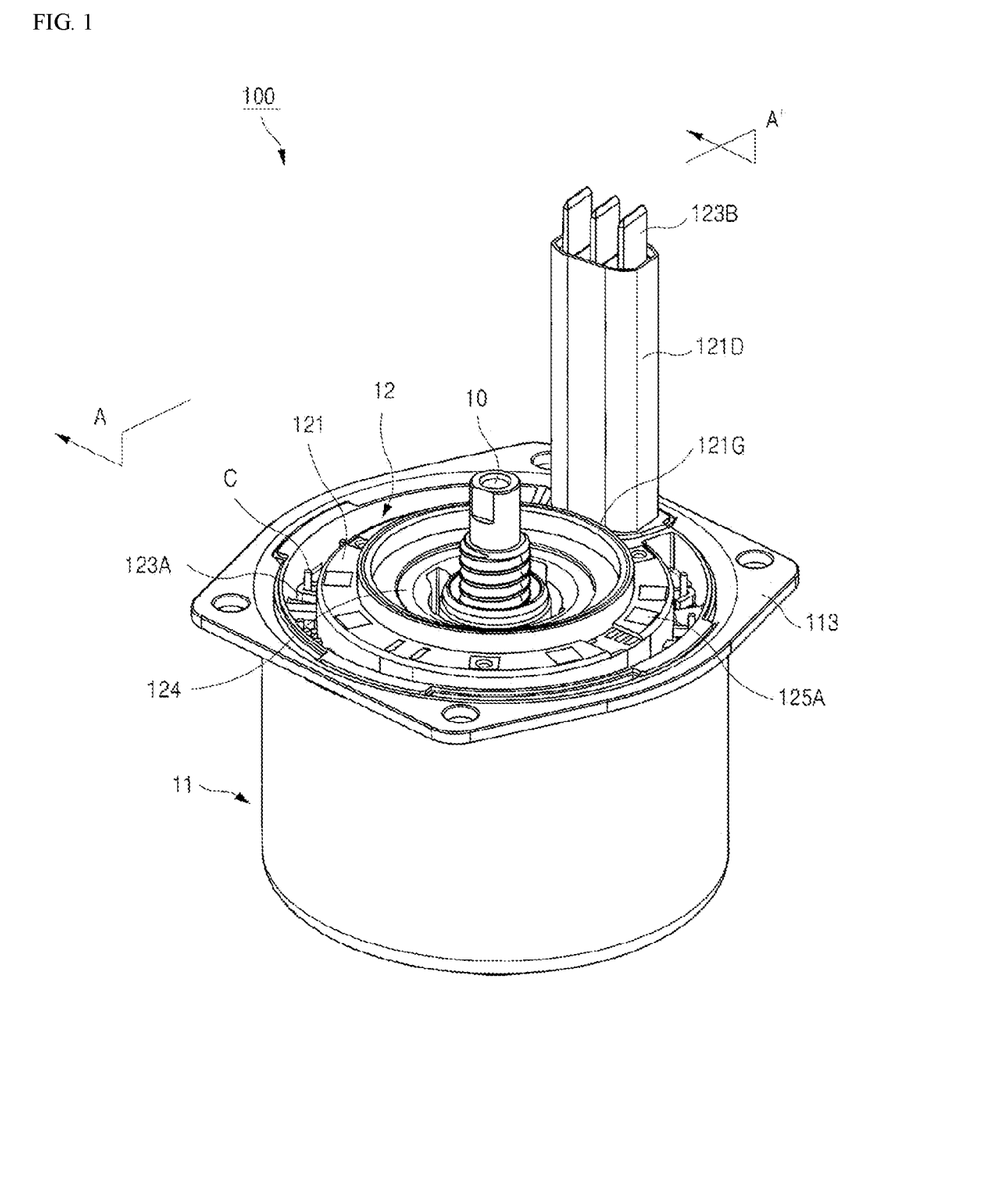
FIG. 1 is a perspective view of a hollow shaft motor according to the present invention.
Figure 2:
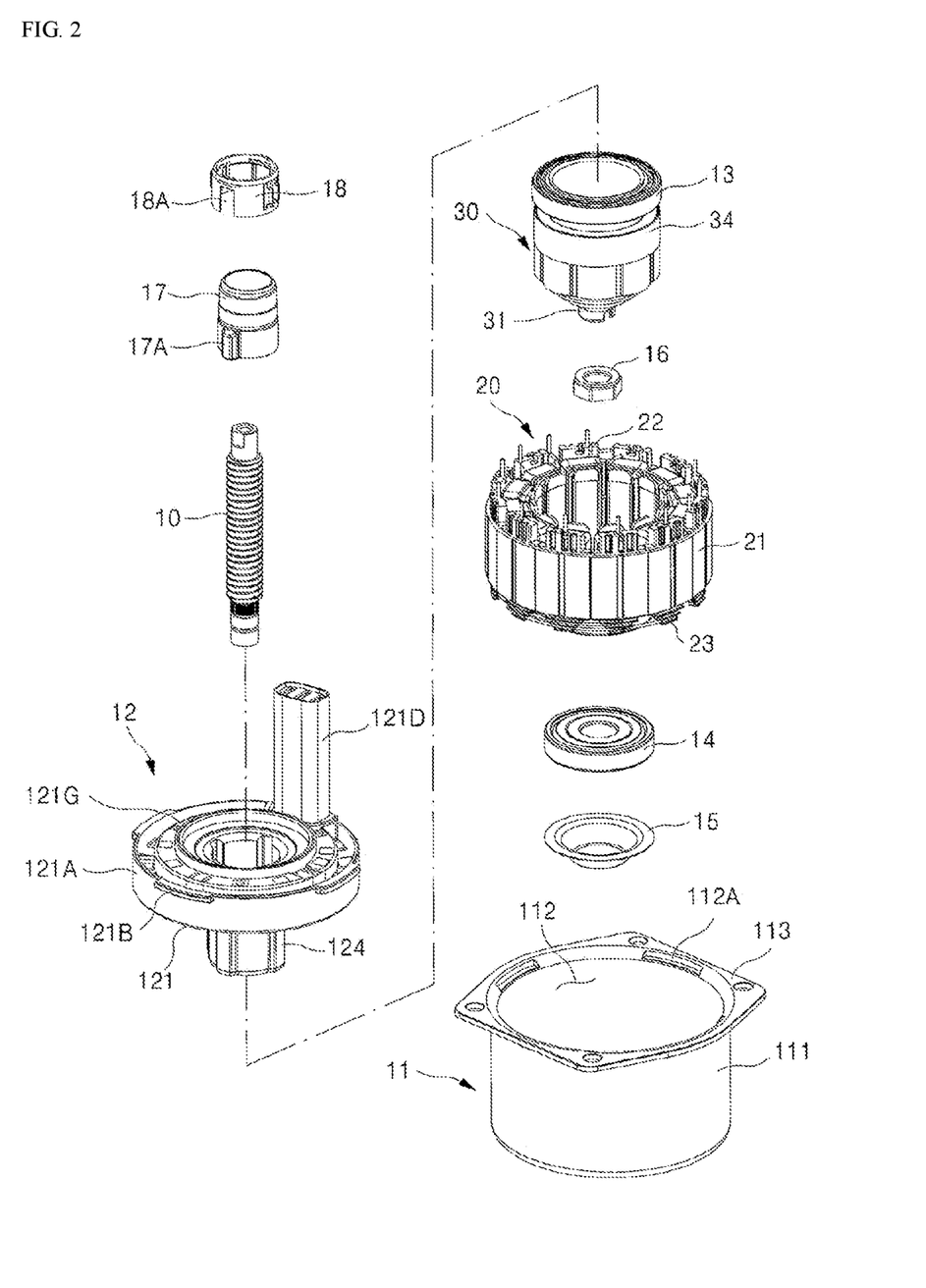
FIG. 2 is an exploded perspective view of the hollow shaft motor according to the present invention.
Figure 3:
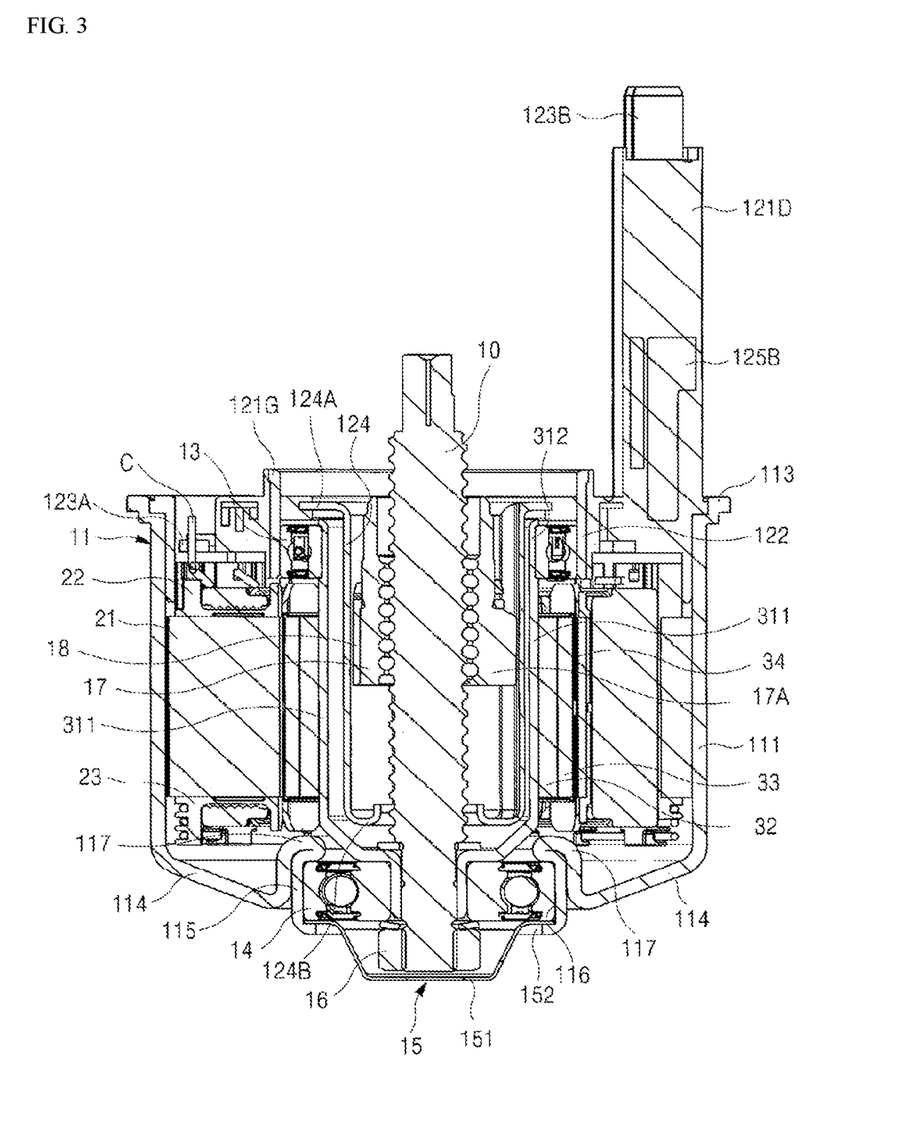
FIG. 3 is a cross-sectional view taken along the A-A' direction of FIG. 1.

FIG. 1 is a perspective view of a hollow shaft motor 100 according to the present invention, FIG. 2 is an exploded perspective view of the hollow shaft motor 100 according to the present invention, and FIG. 3 is a cross-sectional view taken along the A-A' direction of FIG. 1.

As illustrated in FIGS. 1 to 3, the hollow shaft motor 100 according to the present invention includes a screw shaft 10, a motor housing 11, a stator assembly 20 coupled to an inner side of the motor housing 11, and a rotor assembly 30 located in the stator assembly 20.

The screw shaft 10 has a lower end portion coupled to the hollow shaft 31 so as to rotate with the rotor assembly 30. A ball nut 17 is coupled to an outer circumferential surface of the screw shaft 10, and the ball nut 17 moves up and down according to the rotation of the screw shaft 10, thereby generating or removing the pressure in the piston (not illustrated).

The motor housing 11 can be manufactured by a continuous process using pressing equipment such as a transfer mold. The motor housing 11 has a body part 111 having a cylindrical shape whose upper portion and lower portion are open. The part that is open to the upper side of the motor housing 11 is an inner space part 112, and a flange part 113 extending in the horizontal direction is formed around the upper portion of the inner space part. A housing cover assembly 12 is coupled to the inner space part 112 so as to cover an upper portion of the inner space part 112. The flange part 113 is coupled to a block (not illustrated) of a brake system.

A bottom part 114 extending towards the center is formed in a lower portion of the body part 111, and the bottom part 114 may have a shape with a smaller horizontal cross-section diameter downwardly. A lower protruding part 115 protruding downwardly is formed in a central portion of the bottom part 114. A lower bearing coupling part 116 to which a lower bearing 14 is coupled is formed in a space inside the lower protruding part 115. A curved bent part 117 in which the bottom part 114 and the lower protruding part 115 are connected is formed in an upper end portion of the lower bearing coupling part 116. In other words, the curved bent part 117 has a shape where a central portion of the bottom part 114 is bent in the upward direction so as to be connected to the lower protruding part 115, which allows the curved bent part 117 to support the upper circumferential surface of the lower bearing 14 so that the lower bearing 14 could be coupled more solidly and intensively.

The curved bent part 117 has a structure wherein the material is bent and folded, to reinforce strength. Thus, when a great load is imposed on the lower bearing 14, the structure can help supporting the load. The lower bearing 14 is press-fitted and coupled to an inner surface of the lower protruding part 115, and the upper circumferential portion of lower bearing 14 is supported by the curved bent part 117. The curved bent part 117 is preferably bent and extended to the inside with the same height as or higher than the bottom part 114, thereby stably supporting the lower bearing 14.

The lower circumferential portion of the lower bearing 14 is supported by a curling part 115A. As illustrated in FIG. 3, the flange part 152 of the rear cover 15 may be interposed between the curling part 115A and the lower circumferential portion of the lower bearing 14. The curling part 115A is formed by subjecting a lower distal portion of the lower protruding part 115 to a curling process by the press.

Figure 5:
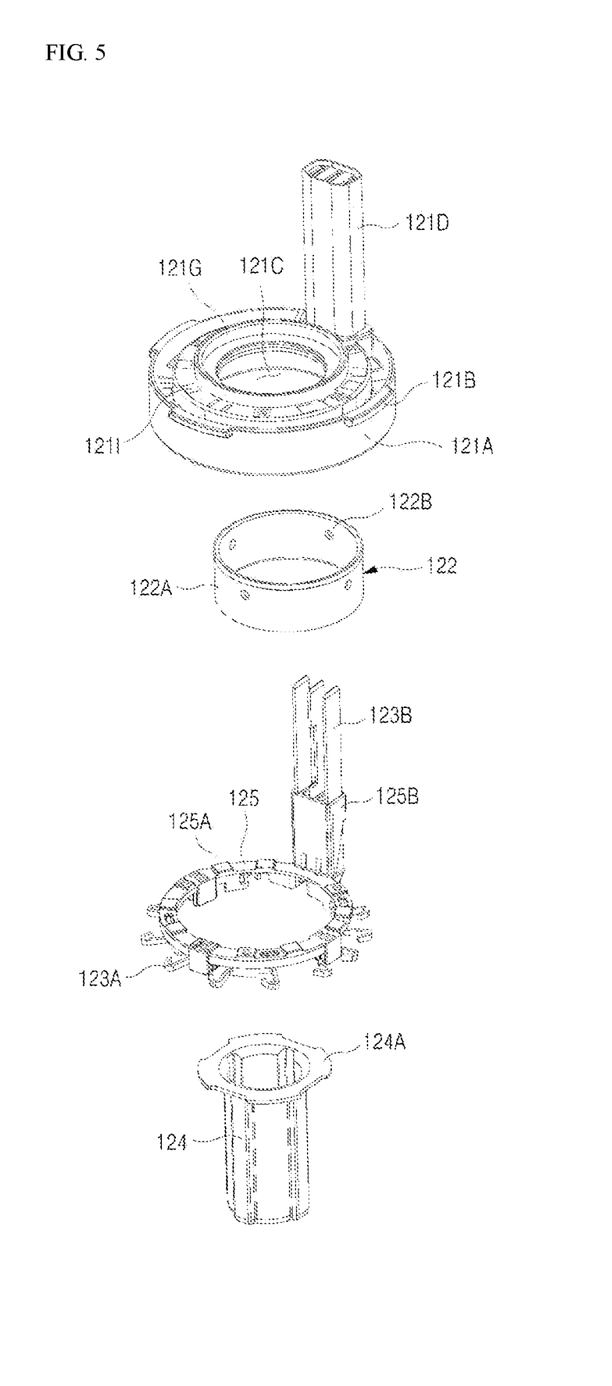
FIG. 5 is an exploded top perspective view of a housing cover assembly of the hollow shaft motor according to the present invention.
Figure 6:
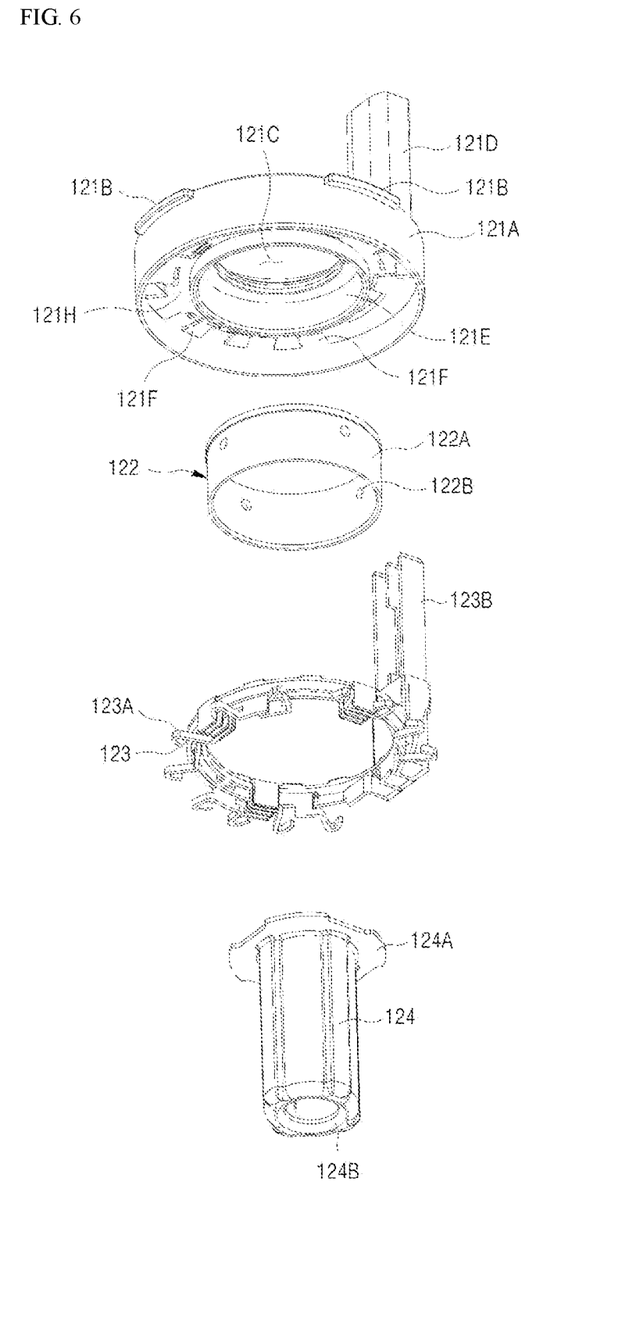
FIG. 6 is an exploded bottom perspective view of a housing cover assembly of the hollow shaft motor according to the present invention.

The housing cover assembly 12 comprises a housing cover 121 produced by a plastic mold, and the housing cover 121, preferably, is made of a plastic mold to be formed by insert injection molding while placing a press ring 122, a bus bar 123 and a sleeve 124 in a mold. Accordingly, the housing cover assembly 12 becomes a member in which the housing cover 121, the press ring 122, the bus bar 123 and the sleeve 124 are integrally formed. Additionally, as another embodiment, the bus bar 123 may be subjected to insert injection molding separately, to be integrally formed with a free mold 125, and then the free mold 125 may be coupled to the housing cover 121. This structure is illustrated in FIGS. 5 and 6.

The housing cover 121 comprises a circular cover main body 121A with a penetrating hole in the middle, a plurality of fitting protrusions 121B formed to radially protrude in the outer circumferential surface of the cover main body 121A, a cavity 121C which is a hole formed to penetrate the center of the cover main body 121A, and a terminal cover 121D formed by protruding upwardly at one upper side of the cover main body 121A. A fitting groove 112A is formed around an upper portion of the inner space part 112 of the motor housing 11 corresponding to the fitting protrusion 121B so that the fitting protrusion 121B is fitted into and coupled to the fitting groove 112A. The terminal cover 121D comprises a bus bar terminal 123B thereinside, allowing the bus bar terminal 123B to be connected to an external power source. A ball nut 17 and a piston (not illustrated) for moving up and down by the rotation of the hollow shaft 31 and the screw shaft 10 are located inside the sleeve 124.

The outer race of the upper bearing 13 is press-fitted and supportedly coupled to the inner side of the press ring 122 which is coupled to the circumference of the cavity 121C of the housing cover 121. The inner race of the upper bearing 13 is supported by an upper bearing coupling groove 312 formed in the upper portion of the hollow shaft 31 to support the rotation of the hollow shaft 31. The sleeve 124 is downwardly extended from an inner space of the hollow shaft 31, allowing the hollow shaft 31 to be independently separated from the inner space of the sleeve 124. Accordingly, a movement space of the piston (not illustrated) which moves up and down may be independently secured.

The lower bearing 14 supports the rotation of a lower bearing supporting part 316 formed in a lower end portion of the hollow shaft 31. The lower bearing 14 is coupled to the lower bearing coupling part 116 formed in a lower end of the motor housing 11.

As illustrated in FIG. 3, the rear cover 15 is coupled to a lower inner side of the lower protruding part 115 of the motor housing 11 to cover the lower portion of the lower protruding part 115. The rear cover 15 is coupled and fixed to the lower protruding part 115 by a curling part 115A at a lower end of the lower protruding part 115. A lock nut 16 is coupled to a lower end of the screw shaft 10.

The ball nut 17 is coupled to the screw shaft 10 to be vertically movable. When the screw shaft 10 rotates, the ball nut 17 moves in the upward or downward direction according to the rotational direction, and the piston (not illustrated) coupled to the ball nut 17 also moves. When the ball nut is located in the bottom dead center, a bottom portion of the ball nut 17 may be inserted into an inner bottom portion of the sleeve 124 or receive an impact. In order to avoid the impact, a damper 18 may be coupled to the ball nut 17. At least one protruding part 17A protruding in the outer circumferential direction is formed in an outer circumferential surface of the ball nut 17, and a slit 18A into which the protruding part 17A is inserted may be formed in the damper 18.

The stator assembly 20 comprises a stator core 21 press-fitted and fixed to an inner side of the body part 111 of the motor housing 11, an upper insulator 22 coupled to an upper portion of the stator core 21, and a lower insulator 23 coupled to a lower portion of the stator core 21. A coil C is wound around each insulator, and the coil is electrically connected to a bus bar 123 of the housing cover assembly 12 coupled to an upper portion of the upper insulator 22. The bus bar 123 is electrically connected to an external power source through a bus bar terminal 123B. The bus bar terminal 123B is surrounded and protected by a terminal cover 121D.

The outer circumferential portion of the housing cover 121 is press-fitted and coupled to an upper portion of the inner space part 112 formed in the upper inner side of the body part 111 of the motor housing 11. Detailed features of the housing cover 121 will be explained again with reference to FIGS. 5 and 6 in the following.

Figure 4:
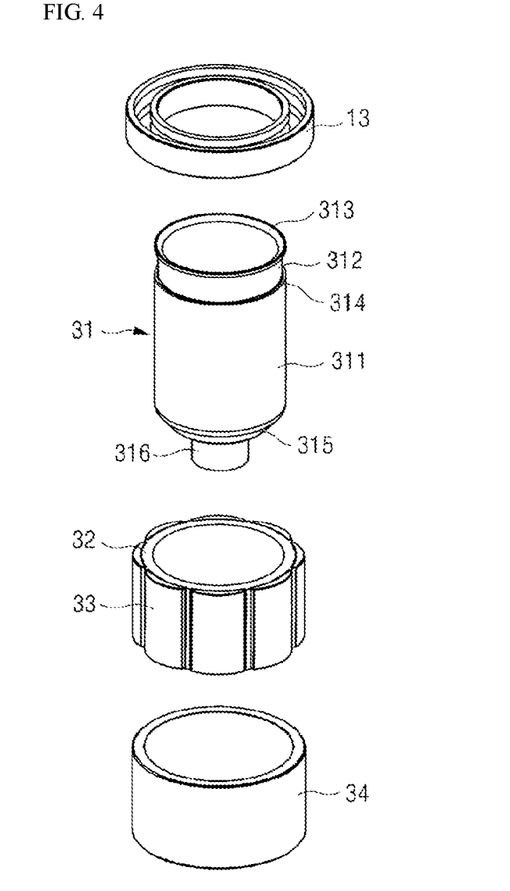
FIG. 4 is an exploded perspective view of a rotor assembly of the hollow shaft motor according to the present invention.

FIG. 4 is an exploded perspective view of a rotor assembly 30 of the hollow shaft motor 100 according to the present invention. Referring to FIGS. 3 and 4 together, the rotor assembly 30 of the present invention is located inside the stator assembly 20 to rotate. To this end, the rotor assembly 30 comprises a hollow shaft 31, a rotor core 32 coupled to the outer circumference of the hollow shaft 31, a plurality of magnets 33 attached to an outer circumference of the rotor core 32, and a rotor can 34 coupled to an outer circumferential portion of the magnet 33.

The hollow shaft 31 has a hollow shaft housing 311 having a cylindrical shape. The rotor core 32 is coupled to an outer circumferential surface of the hollow shaft housing 311. A plurality of magnets 33 are attached to an outer circumferential surface of the rotor core 32. As needed, the rotor core 32 may be omitted, and the plurality of magnets 33 may be directly attached to the outer circumferential surface of the hollow shaft housing 311. The rotor can 34 is press-fitted and coupled to the outer circumferential surface of the magnet 33.

An upper bearing coupling groove 312 having a slightly smaller diameter than the hollow shaft housing 311 is formed in an upper portion of the hollow shaft housing 311. The rotation of the inner race of the upper bearing 13 is supported by the upper bearing coupling groove 312. An upper stepped part 313 bent outwardly is formed at an upper portion of the upper bearing coupling groove 312, and a lower stepped part 314 is formed at a lower portion of the upper bearing coupling groove 312, so as to have a groove shape for coupling the inner race of the upper bearing 13 to the upper bearing coupling groove 312. The upper stepped part 313 may be formed by a curling process during the press molding process.

A reduced diameter part 315 which is a part bent and connected so that the diameter thereof is gradually reduced to the diameter of the lower bearing supporting part 316 is formed at a lower end portion of the hollow shaft housing 311. The rotation of the lower bearing supporting part 316 protruding from the reduced diameter part 315 is supported by the lower bearing 14.

FIG. 5 is an exploded top perspective view of a housing cover assembly 12 of the hollow shaft motor 100 according to the present invention, and FIG. 6 is an exploded bottom perspective view thereof.

Referring to FIGS. 5 and 6 together with FIG. 3, the housing cover assembly 12 of the present invention comprises a housing cover 121, a press ring 122, a bus bar 123, a sleeve 124, and a free mold 125. As mentioned in the above, since the housing cover 121 is molded by insert injection together with the press ring 122 and the sleeve 124, it is not possible to provide an exploded view as illustrated in FIGS. 5 and 6, but here, an exploded view thereof is provided for the sake of convenience in explanation.

The housing cover 121 comprises a cover main body 121A, a fitting protrusion 121B, a cavity 121C and a terminal cover 121D. A settlement space 121E, which is where the press ring 122 is coupled and which becomes an inner side surface of the cover main body 121A, is formed. A coil connecting part 121F has a plurality of holes towards a lower side of the cover main body 121A, and a coil coupling part 123A of the bus bar 123 is located inside the coil connecting part 121F. A coil (not illustrated) wound around the stator assembly 20 is electrically connected to the coil coupling part 123A. This connection between the coil and coil coupling part 123A is made in the coil connecting part 121F.

A ring-shaped protruding ring 121G protruding upwardly is formed around a cavity 121C at the upper portion of the housing cover 121. When the hollow shaft motor 100 according to the present invention is installed in a brake system (not illustrated), the protruding ring 121G helps the hollow shaft motor to be installed at an exact position, and helps the screw shaft 10 to be coupled to the brake system maintaining its exact center.

The press ring 122 is made of metal so that the upper bearing 13 can be firmly coupled, and the press ring 122 is coupled to the housing cover 121 as one part by insert injection. The press ring 122 comprises a press ring main body 122A and a plurality of fastening holes 122B formed to penetrate a side of the press ring main body 122A. The outer race of the upper bearing 13 is coupled to an inner side surface of the press ring main body 122A. The fastening hole 122B allows a resin melted product to penetrate therethrough so that the press ring 122 is well coupled to the housing cover 121.

The bus bar 123 is made of a conductive material so that coils on the same phase are electrically connected to each other to receive an external power source. The bus bar 123 comprises a plurality of coil coupling parts 123A formed to radially protrude from the ring shape, and a bus bar terminal 123B for connecting to the external power source. The bus bar 123 is integrally injection molded with the free mold 125 in the insert injection mold except for some parts of the coil coupling part 123A and the bus bar terminal 123B. Detailed features of the bus bar 123 will be explained again with reference to FIGS. 7 and 8 in the following. The free mold 125 maintains the plurality of bus bars 123 in their accurate locations, and is formed in a ring shape in an upper portion of the bus bar 123. The plurality of coupling protruding parts 125A protrude upwardly in an upper portion of the ring-shaped free mold 125, and the coupling protruding parts 125 are inserted into the plurality of coupling holes I formed in the housing cover 121. Also, a terminal supporting part 125B which covers part of the bus bar terminal 123B while protruding upwardly is formed at one side of the free mold 125. Accordingly, the bus bar 123 can be easily and accurately coupled to a free mold mounting part H inside the lower portion of the housing cover 121 through the free mold 125, thereby improving workability and reliability.

The sleeve 124 has a cylindrical shape vertically penetrated, and a flange 124A radially extended is formed in an upper portion of the sleeve 124. The flange 124A is located in the upper portion of the cavity 121C of the housing cover 121, and the flange 124A is surrounded by a plastic resin forming the housing cover 121. A screw shaft 10 for moving the piston (not illustrated) up and down and a ball nut 17 are located in the inner space of the sleeve 124.

An inner upward bending part 124B which is bent inwardly, i.e., towards the screw shaft 10 and has a distal end portion thereof bent upwardly is formed in a lower portion of the sleeve 124. The cross-sectional shape of the inner upward bending part 124B is bent in a "J" shape as illustrated in FIG. 3, thereby preventing the ball nut 17 from being pinched inside the sleeve 124 when the ball nut 17 is located at the bottom, allowing absorption of the impact that occurs while the bottom of the ball nut 17 hits the bottom distal end of the sleeve 124, and also preventing the grease coated on the ball nut 17 from leaking to the outside.

Figure 7:
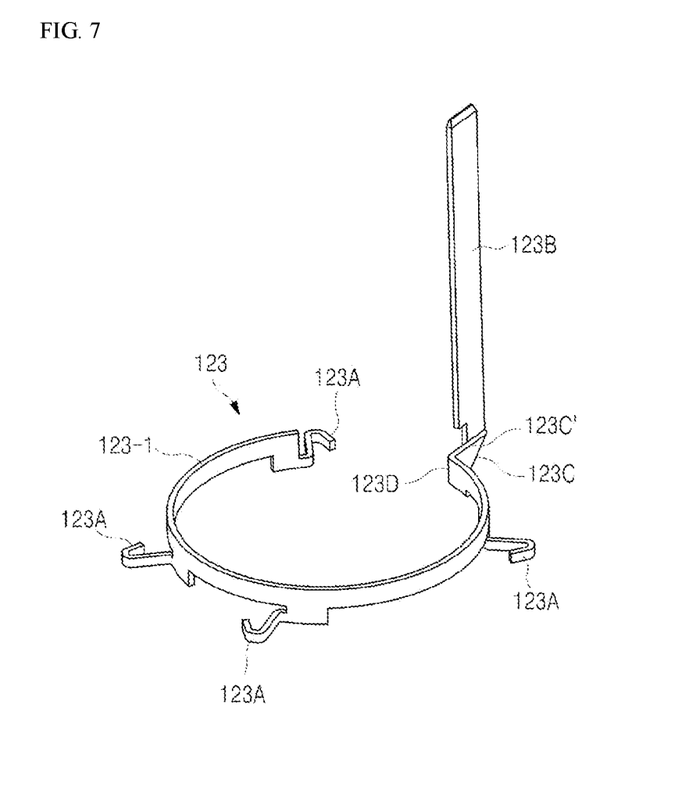
FIG. 7 is a perspective view of a bus bar of the hollow shaft motor according to the present invention.
Figure 8:
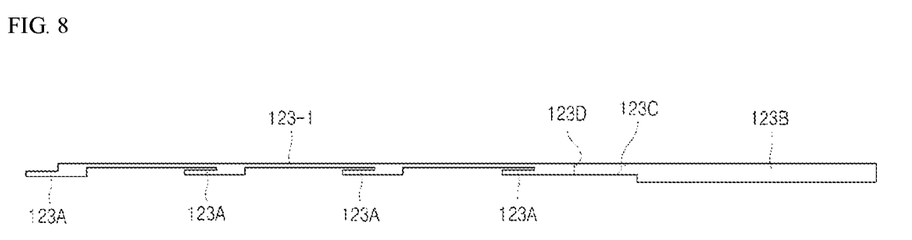
FIG. 8 is a perspective view unfolding the bus bar of the hollow shaft motor according to the present invention.

FIG. 7 is a perspective view of a bus bar 123 of the hollow shaft motor according to the present invention, and FIG. 8 is a perspective view unfolding the bus bar 123 of the hollow shaft motor according to the present invention. Referring to FIGS. 7 and 8 together, the bus bar 123 of the present invention includes a bus bar main body 123-1 circularly bent; a plurality of coil coupling parts 123A formed in the bus bar main body 123-1 and bent to be electrically connected to a coil; a bus bar terminal 123B formed at one end of the bus bar main body 123-1 to be electrically connected to an external power source; a first bending part 123C bent in order for the bus bar terminal 123B to protrude upwardly from the bus bar 123; and a second bending part 123D bent to locate the bus bar terminal 123B in the circular outer portion of the bus bar main body 123-1. FIGS. 5 and 6 illustrate 3 bus bars 123. In the case 5 of 3-phase brushless motor, 3 bus bars 123 wind 3-phases of U, V and W, respectively. Additionally, a total of 12 coil coupling parts 123A are formed, i.e., 4 coil coupling parts for each phase, and this is because the motor has 12 slots around which the coil is wound. The number of the bus bars 123 or coil coupling parts 123A may vary depending on the type or specification of the motor.

The bus bar 123 is manufactured by being punched by the pressing process with a thin steel sheet such as an electric steel sheet as a base material, and thus if the bus bar 123 has a straight shape, more bus bars 123 could be produced from the base material with the same area compared with the bus bars having the L shape. Therefore, in the present invention, the bus bar 123 is manufactured to have the shape as illustrated in FIG. 7 by bending the straight-shaped bus bar 123 in FIG. 8. The bus bar terminal 123B is formed to protrude upwardly from the bus bar main body 123-1 by bending the first bending part 123C formed in the diagonal direction of the bus bar main body 123-1. In this case, an overlapping part 123C' where materials are overlapped is formed in the bending portion of the first bending part 123C.

By this structure, the amounts of scraps thrown out when manufacturing the bus bar 123 may be reduced. Additionally, when the surface of the bus bar 123 is plated with a conductive metal, more bus bars could be made for the same period of time, thereby improving productivity and reducing manufacturing costs.

The detailed description of the present invention described as above simply explains examples for understanding the present invention, but does not intend to limit the scope of the present invention. The scope of the present invention is defined by the accompanying claims. Additionally, it should be construed that simple modifications or changes of the present invention fall within the scope of the present invention.

The invention claimed is:
1. A hollow shaft motor, comprising:
   a motor housing having a cylindrical shape;
   a housing cover assembly coupled to an upper portion of the motor housing;
   a stator assembly located in the motor housing and in a lower portion of the housing cover assembly;
   a rotor assembly located in the stator assembly to rotate;
   a screw shaft coupled to the rotor assembly to rotate together; and
   a ball nut coupled to the screw shaft to move vertically,
   wherein the housing cover assembly comprises a housing cover having a sleeve extended downwardly so as for the screw shaft to be located inside, and an inner upward bending part bent inwardly and heading upwardly is formed at the bottom end of the sleeve.
2. The hollow shaft motor of claim 1, wherein at least one protruding part protruding in the outer circumferential direc- tion is formed in an outer circumferential surface of the ball nut, and a damper having a slit (18A) into which the protruding part is inserted is coupled to the ball nut.

3. The hollow shaft motor of claim 1, wherein a free mold in which a plurality of bus bars is integrally formed in an insert injection mold is coupled to the housing cover, and a plurality of coupling protruding parts is formed in an upper portion of the free mold, wherein the coupling protruding parts are respectively coupled to a plurality of coupling holes formed in the housing cover.

4. The hollow shaft motor of claim 1, wherein the housing cover includes a plurality of bus bars, wherein the bus bar comprises:

a bus bar main body circularly bent;

a plurality of coil coupling parts formed in the bus bar main body and bent to be electrically connected to a coil;

a bus bar terminal formed at one end of the bus bar main body to be electrically connected to an external power source; and a first bending part bent in order for the bus bar terminal to protrude upwardly from the bus bar.

5. The hollow shaft motor of claim 4, wherein a second bending part bent to locate the bus bar terminal in a circular outer portion of the bus bar main body is formed in the bus bar main body.

* * * * *